US012771578B2

(12) United States Patent
Xiao

(10) Patent No.: US 12,771,578 B2
(45) Date of Patent: Oct. 20, 2026

(54) REFERENCE SIGNAL SAMPLE DATA AND CHANNEL INFORMATION SAMPLE DATA ACQUISITION METHOD AND APPARATUS, AND DEVICE, MEDIUM, CHIP, PRODUCT AND PROGRAM

(71) Applicant: GUANGDONG OPPO MOBILE TELECOMMUNICATIONS CORP., LTD., Dongguan (CN)

(72) Inventor: Han Xiao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 272 days.

(21) Appl. No.: 18/680,363

(22) Filed: May 31, 2024

(65) Prior Publication Data

US 2024/0323059 A1 Sep. 26, 2024

Related U.S. Application Data

(63) Continuation of application No. PCT/CN2021/135300, filed on Dec. 3, 2021.

(51) Int. Cl.
*H04L 25/02* (2006.01)

(52) U.S. Cl.
CPC ...... *H04L 25/0254* (2013.01); *H04L 25/0224* (2013.01)

(58) Field of Classification Search
None
See application file for complete search history.

(56) References Cited

U.S. PATENT DOCUMENTS

2023/0155704 A1* 5/2023 Orekondy ............ H04B 17/309 370/329
2023/0342593 A1* 10/2023 Sun ..................... H04L 25/0224
2024/0396766 A1* 11/2024 Jeong .................. G06N 3/0475

FOREIGN PATENT DOCUMENTS

CN 110875790 A 3/2020
CN 112787966 A 5/2021
CN 113381952 A 9/2021
WO 2016106753 A1 7/2016
WO 2017155634 A1 9/2017

OTHER PUBLICATIONS

Geeks for Geeks on the âDifference between Recursion and Iterationâ (https://www.geeksforgeeks.org/dsa/difference-between-recursion-and-iteration/) published Oct. 23, 2025 (Year: 2025).*

(Continued)

*Primary Examiner* — Ayaz R Sheikh
*Assistant Examiner* — Christopher R Davis
(74) *Attorney, Agent, or Firm* — BAYES PLLC

(57) ABSTRACT

A method for acquiring data, an electronic device and a chip are provided. The method for acquiring data includes that: reference signal sample data and channel information sample data that are generated by a generative model are acquired. Herein, the generative model is obtained through training based on a Generative Adversarial Network (GAN), real reference signals and real channel information, and the reference signal sample data and the channel information sample data are used for training a channel estimation model.

16 Claims, 20 Drawing Sheets

(56) References Cited

OTHER PUBLICATIONS

Geeks for Geeks on the âUnderstanding for-loop in Pythonâ (https://www.geeksforgeeks.org/python/understanding-for-loop-in-python/) published Dec. 29, 2019 (Year: 2019).*
International Search Report in the international application No. PCT/CN2021/135300, mailed on Aug. 26, 2022. 5 pages with English translation.
Written Opinion of the International Search Authority in the international application No. PCT/CN2021/135300, mailed on Aug. 26, 2022. 8 pages with English translation.
Mehran Soltani et al, "Deep Learning-Based Channel Estimation", IEEE Communications Letters, 2019, doi: 10.1109/lcomm.2019.2898944, the whole document. 4 pages.
Ian J. Goodfellow et al, "Generative Adversarial Nets", Advances in neural information processing systems, arXiv: 1406.2661v1 [stat.ML] Jun. 10, 2014, the whole document. 9 pages.
Ishaan Gulrajani et al, "Improved Training of Wasserstein GANs", Montreal Institute for Learning Algorithms, arXiv: 1704.00028, [cs.LG] Dec. 25, 2017, the whole document. 20 pages.

* cited by examiner

REFERENCE SIGNAL SAMPLE DATA AND CHANNEL INFORMATION SAMPLE DATA ACQUISITION METHOD AND APPARATUS, AND DEVICE, MEDIUM, CHIP, PRODUCT AND PROGRAM

CROSS-REFERENCE TO RELATED APPLICATION(S)

This application is a continuation of International Patent Application No. PCT/CN2021/135300, filed on Dec. 3, 2021, the entire contents of which are incorporated herein by reference in its entirety.

BACKGROUND

In view of the great success of Artificial Intelligence (AI) technology in computer vision, natural language processing and other aspects, the AI technology is attempted to be used in the communication field to seek new technical ideas to solve the technical problems limited by traditional methods.

How to train AI models in the communication field is a problem that has been paid close attention to in this field.

SUMMARY

The embodiments of the present disclosure relate to the field of mobile communication technologies, and provide a method for acquiring data, an electronic device, a medium, and a chip.

In a first aspect, an embodiment of the present disclosure provides a method for acquiring data. The method includes the following operation.

Reference signal sample data and channel information sample data that are generated by a generative model are acquired. The generative model is obtained through training based on a Generative Adversarial Network (GAN), real reference signals and real channel information.

The reference signal sample data and the channel information sample data are used for training a channel estimation model.

In a second aspect, an embodiment of the present disclosure provides an electronic device. The electronic device includes a memory and a processor.

The memory is configured to store computer programs that, when executed by the processor, cause the processor to acquire reference signal sample data and channel information sample data that are generated by a generative model. The generative model is obtained through training based on a Generative Adversarial Network (GAN), real reference signals and real channel information.

The reference signal sample data and the channel information sample data are used for training a channel estimation model.

In a third aspect, an embodiment of the present disclosure provides a non-transitory computer-readable storage medium storing one or more programs that, when executed by one or more processors, cause the one or more processor to acquire reference signal sample data and channel information sample data that are generated by a generative model. The generative model is obtained through training based on a Generative Adversarial Network (GAN), real reference signals and real channel information.

The reference signal sample data and the channel information sample data are used for training a channel estimation model.

In a fourth aspect, an embodiment of the present disclosure provides a chip. The chip includes a processor for invoking and running computer programs from a memory to cause a device on which the chip is mounted to acquire reference signal sample data and channel information sample data that are generated by a generative model. The generative model is obtained through training based on a Generative Adversarial Network (GAN), real reference signals and real channel information.

The reference signal sample data and the channel information sample data are used for training a channel estimation model.

BRIEF DESCRIPTION OF THE DRAWINGS

The drawings illustrated herein serve to provide a further understanding of and constitute a part of the present disclosure. The illustrative embodiments of the present disclosure and the description thereof are used to explain the present disclosure, which do not constitute an improper limitation to the present disclosure.

DETAILED DESCRIPTION

The technical solutions of the embodiments of the present disclosure will be described below in combination with the drawings in the embodiments of the present disclosure. It is apparent that the described embodiments are part of the embodiments of the present disclosure, but not all of the embodiments of the present disclosure. Based on the embodiments in the present disclosure, all other embodiments obtained by those skilled in the art without making creative efforts fall within the scope of protection of the present disclosure.

In order to facilitate understanding of the technical solutions of the embodiments of the present disclosure, the technologies related to the embodiments of the present disclosure are described below. The following related technologies may be arbitrarily combined with the technical solutions of the embodiments of the present disclosure as optional solutions, all of which belong to the protection scope of the embodiments of the present disclosure.

Figure 1:
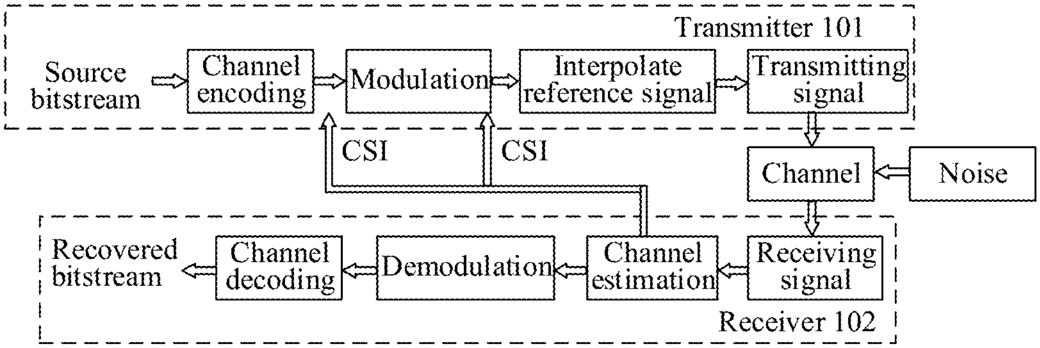
FIG. 1 is a diagram of a communication process of a wireless communication system provided by an embodiment of the present disclosure.

FIG. 1 is a diagram of a communication process of a wireless communication system provided by an embodiment of the present disclosure. As illustrated in FIG. 1, the wireless communication system may include a transmitting end and a receiving end.

At the transmitting end, a transmitter 101 performs channel encoding and modulation on a source bitstream to obtain modulated data; and interpolates, into the modulated data, a reference signal used for channel estimation at the receiving end, and finally forms a transmitting signal which reaches the receiving end through a channel. The transmitting signal will be interfered with by a noise when it is transmitted to the receiving end through the channel.

At the receiving end, a receiver 102 firstly receives the signal transmitted by the transmitting end to obtain a receiving signal, and then performs channel estimation by using the reference signal in the receiving signal to obtain Channel State Information (CSI). The receiving end feeds the CSI back to the transmitting end through a feedback link for the transmitter to adjust the manners of channel encoding, modulation, pre-coding and so on. Finally, the receiver obtains the final recovered bitstream by the operations of demodulating the receiving signal and channel decoding.

It should be noted that FIG. 1 is a simple schematic diagram of the communication process of the wireless communication system. There are other modules not listed in the wireless communication system, such as a resource mapping module, a pre-coding module, an interference cancellation module, a CSI measurement module. These modules are designed and implemented separately, and various separate modules may be integrated to form a complete wireless communication system.

It should also be noted that the above wireless communication system may be a Long Term Evolution (LTE) system, an LTE Time Division Duplex (TDD) system, a Universal Mobile Telecommunication System (UMTS), an Internet of Things (IoT) system, a Narrow Band Internet of Things (NB-IoT) system, an enhanced Machine-Type Communications (eMTC) system, a 5G communication system (which also be referred to as a New Radio (NR) communication system), or a future communication system (e.g., a 6G communication system), or the like.

Due to the complexity and the time variability of wireless channel environments, the estimation and recovery for the wireless channel by the receiver will directly affect the reception of data in the wireless communication system, thus affecting the performance of the communication system.

Figure 2:
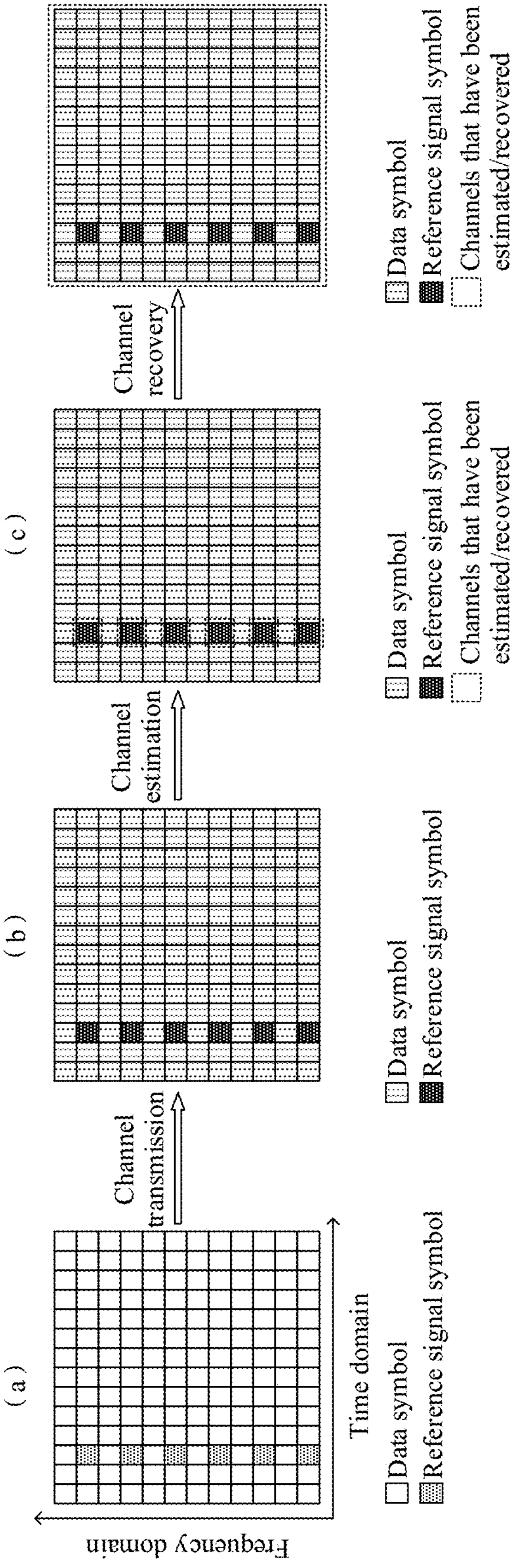
FIG. 2 is a diagram of processes of channel estimation and channel recovery in a wireless communication system provided by an embodiment of the present disclosure.

FIG. 2 is a diagram of processes of channel estimation and channel recovery in a wireless communication system provided by an embodiment of the present disclosure. As illustrated in FIG. 2, part (a) illustrates signals transmitted by the transmitter on time-frequency resources, the signals further include a series of specific pilot symbols (i.e., reference signal symbols) known to the receiver in addition to information data symbols. The reference signal may be a Channel State Information-Reference Signal (CSI-RS), a DeModulation Reference Signal (DMRS), and the like.

The signals transmitted by the transmitter are transmitted to the receiver via channels. As illustrated in part (b), the data symbols and reference signal symbols received by the receiver carry noises (i.e., data symbols and reference signal symbols carrying noises), and the receiver may perform the channel estimation based on the data symbols and reference signal symbols carrying noises. For the channel estimation stage, as illustrated in (c), the receiver may estimate, according to a value of a known reference signal symbol and a value of a received pilot symbol, channel information at the time-frequency position at which the reference signal is located by means of Least Squares (LS) or Minimum Mean Square Error (MMSE). The receiver may then perform channel recovery based on the channel information. For the channel recovery stage, as illustrated in part (d), the receiver recovers channel information on the all time-frequency resources by using an interpolation algorithm according to the channel information estimated at the reference signal symbol positions, for the subsequent channel information feedback or data recovery or the like.

As can be seen from part (c), the resources for the channels that have been estimated/recovered are resources at the positions of the reference signal symbols. As can be seen from part (d), the resources for the channels that have been estimated/recovered are resources at the positions of the reference signal symbols and the data symbols.

In recent years, an AI research represented by the neural network has made great achievements in many fields, and it will also play an important role in the production and life of people for a long time in the future.

Figure 3:
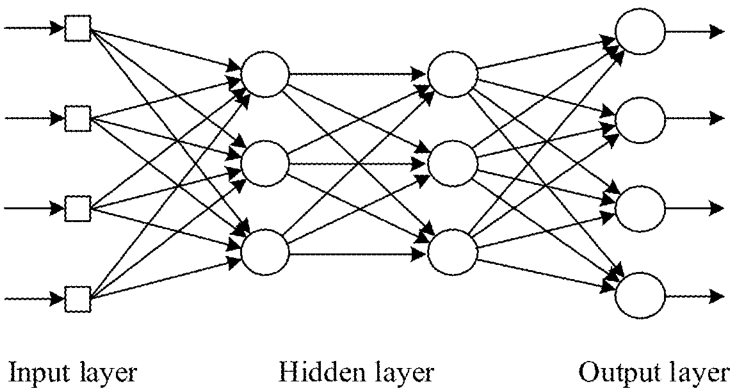
FIG. 3 is a structural diagram of a neural network provided by a related technology.

FIG. 3 is a structural diagram of a neural network provided by a related technology. As illustrated in FIG. 3, a structure of the neural network may include an input layer, a hidden layer and an output layer. As illustrated in FIG. 3, the input layer is responsible for receiving data, the hidden layer is responsible for processing data, and the final result is generated in the output layer. In the structure of the neural network, each node represents a processing unit, which may be considered as simulating a neuron. Multiple neurons form a layer of neural network, and multi-layer information transmission and processing construct a whole neural network.

With the continuous development of a research for the neural network, in recent years, a neural network deep learning algorithm has been proposed, and more hidden layers have been introduced. Feature learning is performed by training the neural network with multiple hidden layers layer by layer, which greatly improves the learning and processing ability of the neural network and is widely used in pattern recognition, signal processing, optimal combination, anomaly detection and so on.

Similarly, with the development of deep learning, a Convolutional Neural Network (CNN) has been further studied.

Figure 4:
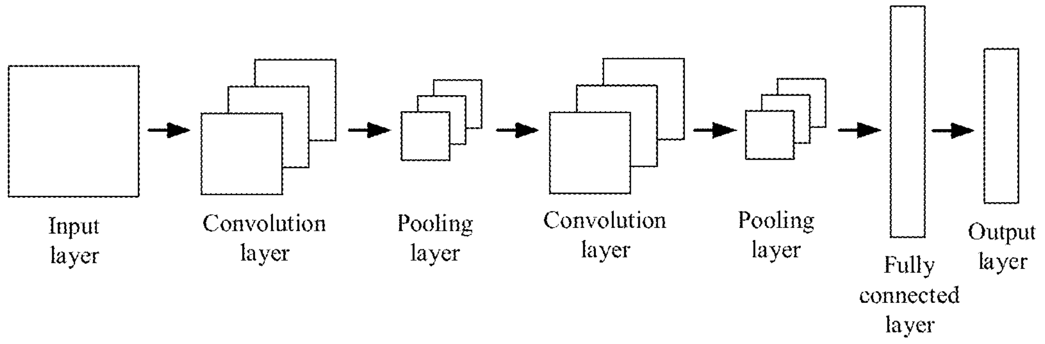
FIG. 4 is a structural diagram of a convolutional neural network provided by a related technology.

FIG. 4 is a structural diagram of a CNN provided by a related technology. As illustrated in FIG. 4, a structure of the CNN may include an input layer, multiple convolution layers, multiple pooling layers, a fully connected layer and an output layer. Through introduction of the convolution layers and the pooling layers, the sharp increase of network parameters is effectively controlled, the number of parameters is limited, the characteristics of local structure are excavated, and the robustness of the algorithm is improved.

Figure 5:
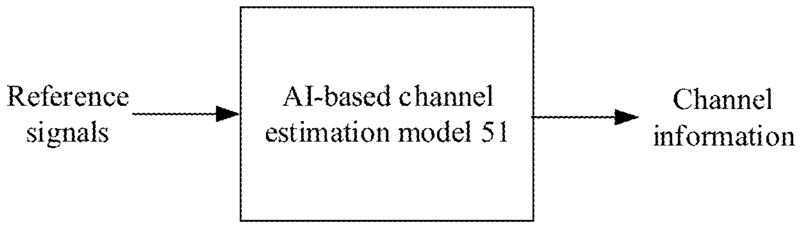
FIG. 5 is a diagram of implementing channel estimation and channel recovery by using AI provided by an embodiment of the present disclosure.

In practical application, the channel estimation and the channel recovery may be implemented by using the AI. Specifically, FIG. 5 is a diagram of implementing the channel estimation and the channel recovery by using the AI provided by an embodiment of the present disclosure. As illustrated in FIG. 5, an AI-based channel estimation model (or called channel recovery model) may be constructed through a neural network, and the channel estimate and the channel recovery are performed by using the channel estimation model. The input data of the AI-based channel estimation model 51 is reference signals and the output data of the AI-based channel estimation model 51 is channel information (i.e., channel estimation result) corresponding to the channels on which the reference signals are transmitted. It should be noted that in addition to the reference signals, the input information of the AI-based channel estimation model 51 may be added with other auxiliary information for improving the performance of the AI-based channel estimation model 51. For example, these other auxiliary information may be information obtained from feature extraction of the reference signals, energy levels, delay characteristics, noise characteristics, and the like.

It should be noted that the reference signals input to the AI-based channel estimation model/channel recovery model 51 include at least reference signals in the receiving signals, that is, reference signals carrying noises.

It is apparent that the AI-based channel estimation model may be obtained by training based on reference signals and corresponding channel information. That is, a training data set of the AI-based channel estimation model includes reference signals and channel information corresponding to the reference signals. Usually, a most direct method to obtain the training data set is to collect the actual wireless channels, for example, to obtain the received reference signals and the channel information corresponding to the reference signals through the paired signal transmitter and signal receiver, or to collect the signals of the third party transmitter (such as a cellular network base station) through a specific receiver to obtain the reference signals received by the receiver and the channel information corresponding to the reference signals. Another method is to generate a large quantity of training sample data by using the simulation platform established by the mathematical model of the channel.

At present, the AI-based channel estimation model has great dependence and demand on the training data set (including reference signals and channel information corresponding to the reference signals). It can be said that the training data set is the key to determine the performance gain of this kind of solution.

However, with the development of the wireless communication system, the frequency band of the wireless communication gradually moves from low frequency to high frequency, and the wireless communication gradually moves towards more complex special environments such as air, space, land and sea, and expands to more scenarios such as human-computer interaction, Internet of Things interaction, industrial application and special application, which makes the wireless channel environment that the current wireless communication system needs to face becomes more and more complex. Therefore, in the above complex wireless channel environment, it is very difficult to collect the received reference signals and channel information. The difficulties are reflected in both the technical aspect and the operational aspect. At the same time, the mathematical modeling for the above complex channels is also facing great challenges. The complexity of frequency bands, environments and scenarios will lead to the complexity of channel modeling. The nonlinear channel characteristics and channel propagation characteristics that are difficult to fit will bring difficulties and challenges to the traditional mathematical modeling to study channels. For example, at present, high frequency-channel modeling is still an urgent problem to be solved. Furthermore, the difference between actual channel environment modeling and ideal channel modeling in complex scenarios and application environments will continue to be increase significantly with the complexity of channel environment in future wireless communication research.

In fact, the construction of AI-based channel estimation model is highly dependent on training data sets, which often needs thousands, tens of thousands, hundreds of thousands or even massive data. Obviously, in the complex wireless channel environment, it is very difficult to obtain a large quantity of sample data required by the channel estimation model. On the one hand, the traditional methods of actually collecting or modeling will have great problems in implementability and reliability. On the other hand, the labor cost of actually collecting massive training sample data is extremely high.

To sum up, how to obtain and construct effective training data sets of the channel estimation model, and then train the channel estimation model, is a key problem to be solved urgently.

Based on this, the embodiments of the present disclosure provide a method for acquiring data. Specifically, an apparatus for acquiring data can acquire reference signal sample data and channel information sample data that are generated by a generative model. The generative model is obtained through training based on a Generative Adversarial Network (GAN), real reference signals and real channel information. In addition, the reference signal sample data and the channel information sample data are used for training a channel estimation model. It can be seen that in the present disclosure, the reference signal sample data and the channel information sample data are generated through the trained generative model, and the generative model is constructed based on the GAN, so that only a small quantity of real reference signals and real channel information are required to implement the training of the generative model, thereby avoiding collection of a large quantity of real reference signals and real channel information as well as the modeling process of the channels, and greatly reducing the difficulty and labor overhead of data acquisition.

It should be noted that the method for acquiring data provided by the embodiments of the present disclosure may be applied to the apparatus for acquiring data provided by the embodiments of the present disclosure. The apparatus for acquiring data may be integrated in an electronic device by means of software or hardware. The electronic device may be a server, a personal computer, an industrial computer, or the like. In addition, the electronic device may also be a network device or a terminal device with a communication function, or the like. The electronic device is not limited in the embodiments of the present disclosure.

The network device may be an Evolution Node B (eNB or cNodeB) in the LTE system, a Next Generation Radio Access Network (NG RAN) device, a base station (gNB) in the NR system, a wireless controller in a Cloud Radio Access Network (CRAN), a relay station, an access point, a vehicle-mounted device, a wearable device, a hub, a switch, a network bridge, a router, or a network device in a future evolution Public Land Mobile Network (PLMN) or the like.

The terminal device may be any terminal device, which includes but not limited to a terminal device in wired or wireless connection with the network device 120 or other terminal devices. For example, the terminal device may refer to an access terminal, a User Equipment (UE), a subscriber unit, a subscriber station, a mobile station, a mobile stage, a remote station, a remote terminal, a mobile device, a user terminal, a terminal, a wireless communication device, a user agent, or a user device. The access terminal may be a cellular telephone, a cordless telephone, a Session Initiation Protocol (SIP) telephone, an IoT device, a satellite handheld terminal, a Wireless Local Loop (WLL) station, a Personal Digital Assistant (PDA), a handheld device having a wireless communication function, a computing device or other processing device connected to a wireless modem, a vehicle-mounted device, a wearable device, a terminal device in a 5G network or a terminal device in a future evolution network, or the like.

In order to facilitate understanding of the technical solutions of the embodiments of the present disclosure, the technical solutions of the present disclosure will be described in detail below by way of specific embodiments. The technologies provided above may be arbitrarily combined with the technical solutions of the embodiments of the present disclosure as optional solutions, and all of them belong to the protection scope of the embodiments of the present disclosure. Embodiments of the present disclosure include at least a part of the following contents.

Figure 6:
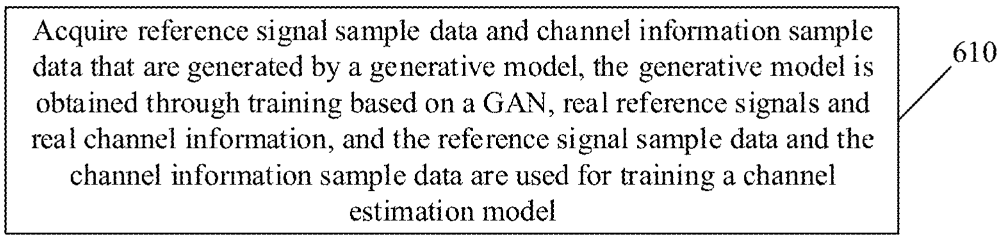
FIG. 6 is a first flowchart of a method for acquiring data provided by an embodiment of the present disclosure.

FIG. 6 is a first flowchart of a method for acquiring data provided by an embodiment of the present disclosure. As illustrated in FIG. 6, the method includes the following contents.

In operation 610, reference signal sample data and channel information sample data that are generated by a generative model are acquired. The generative model is obtained through training based on a Generative Adversarial Network (GAN), real reference signals and real channel information. The reference signal sample data and the channel information sample data are used for training a channel estimation model.

It should be understood that the generative model here refers to a pre-trained model. The generative model may be obtained through training based on the GAN, the real reference signals and the real channel information.

The GAN is a deep learning model and is one of the most promising methods for unsupervised learning on complex data distribution. The GAN produces the expected output through the mutual game learning between (at least) two models: a Generative Model and a Discriminative Model. The generative model is used for generating virtual data, and the discriminative model is used for discriminating whether the virtual data generated by the generative model is true or false (or used for discriminating whether the virtual data is generated by the generative model or comes from real data). In practical application, the discriminative model and the generative model may be trained alternately, so that the data generated by the trained generative model may deceive the discriminative model. That is to say, for the virtual data generated by the trained generative model, the discriminative model cannot discriminate whether the virtual data is the data generated by the generative model or the real data. It can be seen that the virtual data generated by the trained generative model may be comparable to the real data.

The generative model in embodiments of the present disclosure may be obtained through training based on real reference signals and real channel information. The generative model in the embodiments of the present disclosure is specifically used for generating virtual reference signal sample data and virtual channel information sample data.

It may be understood that the generative model in the embodiments of the present disclosure generates reference signal sample data and channel information sample data that may be very close to the real reference signals and real channel information. Therefore, a large quantity of reference signal sample data and channel information sample data may be generated by the generative model to constitute training data sets for training the channel estimation model.

In the embodiments of the present disclosure, the real reference signals used for training the above generative model may at least include the reference signals (also referred to as the received reference signals) received by the receiver, that is, the reference signals carrying noises. Here, the real reference signals have association relationships with the real channel information, and one real reference signal may correspond to one piece of real channel information. For convenience of description, the reference signals hereinafter refer to received reference signals.

Alternatively, the real reference signals are received through channels corresponding to the real channel information. That is, the receiver receives the above real reference signals on the channels corresponding to the real channel information.

Alternatively, both a quantity of the real reference signals used for training of the generative model and a quantity of the real channel information used for training of the generative model are a preset quantity. The preset quantity is less than or equal to a first threshold value. The first threshold value may be 50 or 100, which is not limited in the embodiments of the present disclosure.

It can be seen that the quantity of the real reference signals used for training the generative model provided by the present disclosure and the quantity of the real channel information used for training the generative model provided by the present disclosure are far less than the tens of thousands of real reference signals and real channel information required for training the channel estimation model in the related art. That is, the embodiments of the present disclosure only rely on a small quantity of real reference signals and real channel information to construct the generative model. In this way, the generative model provided by the embodiments of the present disclosure may generate a large quantity of reference signal sample data and channel information sample data close to reality to be used for training of the channel estimation model, thereby avoiding collection of a large quantity of real reference signals and real channel information as well as the modeling process of the channels, and greatly reducing the difficulty and labor overhead of data acquisition.

It should be noted that the above multiple real reference signals and multiple pieces of real channel information may be real data acquired in various frequency bands, radio frequency environments and wireless channel scenarios. In this way, the generative model obtained through training based on real reference signals and real channel information in different frequency bands, radio frequency environments and wireless channel scenarios may also generate reference signal sample data and channel information sample data corresponding to different frequency bands, radio frequency environments and wireless channel scenarios. In this way, the diversity of reference signal sample data and channel information sample data is ensured.

Alternatively, since the real reference signals have association relationships with the real channel information, accordingly, the reference signal sample data generated by the generative model also has association relationships with the channel information sample data generated by the generative model. The reference signal sample data may be in one-to-one correspondences with the channel information sample data, i.e., one piece of reference signal sample data corresponds to one piece of channel information sample data. In this way, the reference signal sample data and the channel information sample data that have the association relationship may constitute a virtual reference signal-channel information data pair for training of the channel estimation model.

It can be seen that in the method for acquiring data provided by the embodiments of the present disclosure, the apparatus for acquiring data can acquire the reference signal sample data and the channel information sample data that are generated by the generative model. The generative model is obtained through training based on the GAN, the real reference signals and the real channel information. In addition, the reference signal sample data and the channel information sample data are used for training the channel estimation model. It can be seen that the reference signal sample data and the channel information sample data in the present disclosure are generated through the trained generative model, and the generative model is constructed based on the GAN, so that the training of the generative model can be implemented only by a small quantity of real reference signals and real channel information, thus avoiding collection of a large quantity of real reference signals and real channel information as well as the modeling process of the channels, and greatly reducing the difficulty and labor overhead of data acquisition.

How to generate the reference signal sample data and the channel information sample data by using the generative model is described in detail below.

In some embodiments, the generative model may include a reference signal generative model and a channel generative model. Specifically, the reference signal generative model is used for generating the reference signal sample data, and the channel generative model is used for generating the channel information sample data. That is to say, the generative model provided by the embodiments of the present disclosure may respectively generate the reference signal sample data and the channel information sample data that have association relationships by using two separate generative models.

Figure 7:
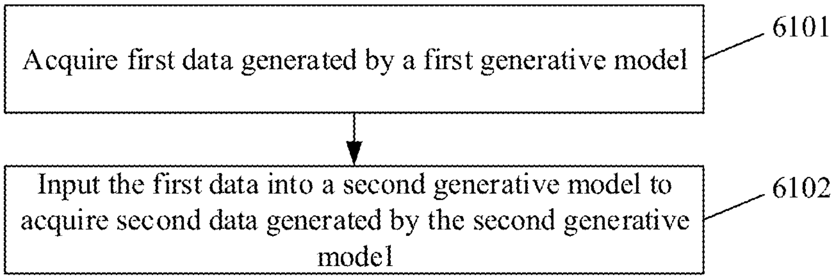
FIG. 7 is a second flowchart of a method for acquiring data provided by an embodiment of the present disclosure.

Specifically, referring to the flowchart illustrated in FIG. 7, the operation 610 that the reference signal sample data and the channel information sample data that are generated by the generative model are acquired may be implemented by the following operations.

In operation 6101, first data generated by a first generative model is acquired.

In operation 6102, the first data is input into a second generative model to acquire second data generated by the second generative model.

In one possible implementation, the first generative model may be a reference signal generative model, and accordingly, the second generative model may be a channel generative model.

In this implementation, the channel generative model may also be referred to as a channel generative model that is conditional on reference signal.

Figure 8:
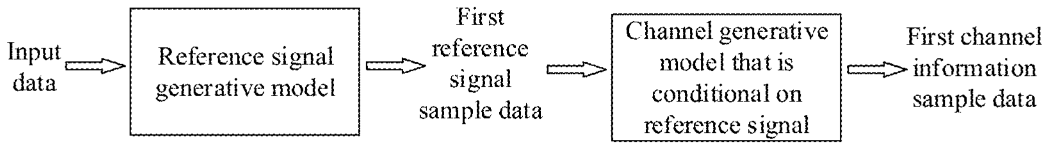
FIG. 8 is an interface diagram of a reference signal generative model and a channel generative model that is conditional on reference signal provided by an embodiment of the present disclosure.

FIG. 8 illustrates an interface diagram of a reference signal generative model and a channel generative model that is conditional on reference signal. The output of the reference signal generative model may be connected to the input of the channel generative model that is conditional on reference signal.

That is, the apparatus for acquiring data may firstly acquire first reference signal sample data (i.e., the first data) generated by the reference signal generative model, and then, the apparatus for acquiring data may input the first reference signal sample data into the channel generative model that is conditional on reference signal. Thus, the channel generative model that is conditional on reference signal may generate, based on the input first reference signal sample data, first channel information sample data (i.e., the second data) that has association relationships with the first reference signal sample data.

Alternatively, the reference signal generative model may have no input data, that is, the apparatus for acquiring data may directly generate the first reference signal sample data by using the reference signal generative model.

Alternatively, the reference signal generative model may take, as input data, at least one of following data: noise, random number, channel type indication information, real reference signal, or statistical information of real reference signal.

The noise may be noise data from a real environment or artificially generated noise data, which is not limited in the embodiments of the present disclosure.

In addition, the random number may be a random number sequence or a pseudo-random number sequence, which is not limited in the embodiments of the present disclosure.

It should be noted that the data format of the noise and the random number taken as the input data of the reference signal generative model may be a one-dimensional vector, a two-dimensional matrix, or higher dimensional data, which is not limited in the embodiments of the present disclosure. In addition, the data format of the noise and the random number may be agreed in advance or may be consistent with the data format of the generated reference signal sample data, which is not limited in the embodiments of the present disclosure.

The channel type indication information in the embodiments of the present disclosure may include at least one of: first indication information indicating a frequency band in which a channel is located; second indication information indicating a radio frequency environment; or third indication information indicating a wireless channel scenario.

Exemplarily, the first indication information may indicate whether a high frequency or a low frequency is located currently. The second indication information may indicate that the current radio frequency environment is an indoor environment, an outdoor environment, a dense cell environment, or an open outfield environment. The third indication information may indicate whether the current wireless channel scenario is an IoT scenario or an industrial scenario, or the like.

In addition, the real reference signal may be actually collected or acquired by mathematical modeling. The statistical information of the real reference signal includes but is not limited to a maximum power spectral density, an average power spectral density and/or the like of the real reference signal.

It may be understood that the reference signal generative model may generate the first reference signal sample data under one or more frequency bands, radio frequency environments and wireless channel scenarios based on the above input data, so as to ensure the diversity and richness of the generated first reference signal sample data.

Figure 9:
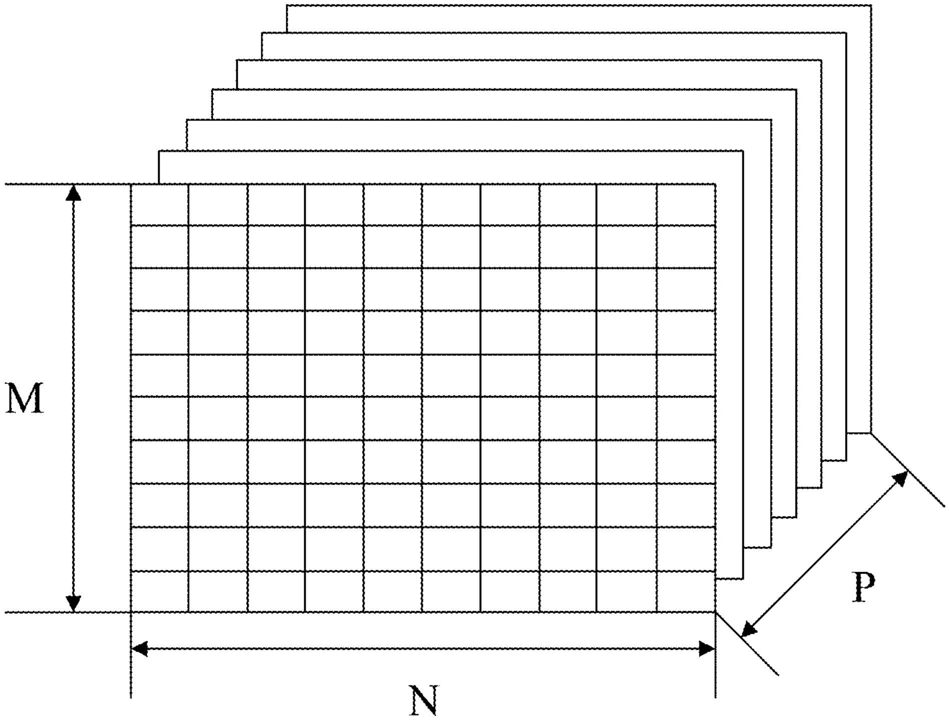
FIG. 9 is a structural diagram of reference signal data provided by an embodiment of the present disclosure.

In the embodiments of the present disclosure, referring to a structural diagram of reference signal data illustrated in FIG. 9, a single piece of first reference signal sample data may be composed of three-dimensional data with a size of M*N*P. The values of M, N and P may be equal or not equal, which are not limited in the embodiments of the present disclosure. In addition, the three-dimensional data of M*N*P may be synthesized (or concatenated) into a one-dimensional vector of 1*(M*N*P) or (M*N*P)*1, and the data format of the reference signal sample data is not limited in the embodiments of the present disclosure.

Three dimensions of the first reference signal sample data illustrated in FIG. 9 may represent a frequency domain dimension, a time domain dimension and an antenna pair domain dimension, respectively. Each unit in the frequency domain dimension corresponds to a respective subcarrier, each unit in the time domain dimension corresponds to a respective time domain symbol, and each unit in the antenna pair dimension corresponds to a respective antenna pair.

It should be noted that in general, the reference signal may be presented by a complex number. Therefore, the above first reference signal sample data output by the reference signal generative model may be added with an additional dimension (i.e., the fourth dimension) on the basis of the three-dimensional data above, and the fourth dimension may characterize the real part and the imaginary part of the first reference signal sample data. However, the first reference signal sample data in the embodiments of the present disclosure is not limited to four dimensions or less, and the first reference signal sample data may also include information of more dimensions.

Referring to FIG. 8, the input of the channel generative model that is conditional on reference signal in the embodiments of the present disclosure may be the first reference signal sample data, and the output of the channel generative model that is conditional on reference signal may be channel information corresponding to the first reference signals, i.e., the first channel information sample data.

Alternatively, similar to the data format of the first reference signal sample data, the first channel information sample data may be composed of data in three dimensions of a frequency domain, a time domain and an antenna pair domain. Exemplarily, referring to FIG. 10, the first channel information sample data may be composed of three-dimensional data with a size of I*J*K. The values of I, J and K may be equal or not equal, which are not limited in the embodiments of the present disclosure. In addition, the three-dimensional data of I*J*K may be synthesized into a one-dimensional vector of 1*(I*J*K) or (I*J*K)*1, and the data format of the channel information sample data is not limited in the embodiments of the present disclosure.

Alternatively, I may have the same value as N, J may have the same value as M, and P may have the same value as K.

It should be noted that the channel information may also be presented by a complex number. Therefore, the above first channel information sample data output by the channel generative model that is conditional on reference signal may be added with an additional dimension (i.e., the fourth dimension) on the basis of the three-dimensional data above, and the fourth dimension may characterize the real part and the imaginary part of the first channel information sample data. However, the first channel information sample data in the embodiments of the present disclosure is not limited to four dimensions or less, and the first channel information sample data may also include information of more dimensions.

It should be noted that the first channel information sample data outputted by the channel generative model that is conditional on reference signal may be channel characteristic information obtained by mathematical transformation to original channel information, for example, channel characteristic vector information obtained by the Singular Value Decomposition (SVD), which may be channel characteristic vector information of a single stream, or may be channel characteristic vector information of multiple streams, e.g., channel characteristic vector information of 2 streams, 4 streams or 8 streams, which is not limited in the embodiments of the present disclosure.

In the embodiments of the present disclosure, the input data of the channel generative model that is conditional on reference signal may be the first reference signal sample data under one or more frequency bands, radio frequency environments and wireless channel scenarios. Therefore, accordingly, the above channel generative model that is conditional on reference signal may also generate the first channel information sample data under one or more frequency bands, radio frequency environments and wireless channel scenarios.

Thus, in this implementation, a large quantity of virtual first reference signal sample data may be firstly generated through the reference signal generative model, and then the generated first reference signal sample data is used for generating respective first channel information sample data corresponding to each first reference signal sample data through the channel generative model that is conditional on reference signal, so as to construct multiple pairs of reference signal-channel information sample data with association relationships, for training the channel estimation model.

In another implementation, the first generative model may be a channel generative model, and accordingly, the second generative model may be a reference signal generative model.

In the another implementation, the reference signal generative model may also be referred to as a reference signal generative model that is conditional on channel.

Figure 11:
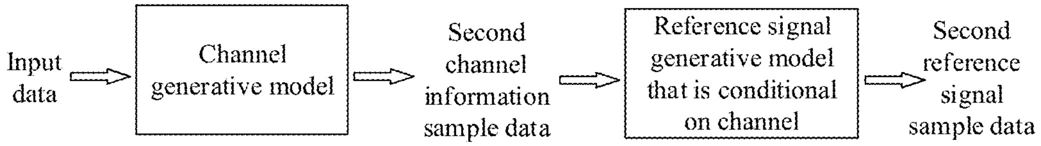
FIG. 11 is an interface diagram of a channel generative model and a reference signal generative model that is conditional on channel provided by an embodiment of the present disclosure.

FIG. 11 illustrates an interface diagram of a channel generative model and a reference signal generative model that is conditional on channel. The output of the channel generative model may be connected to the input of the reference signal generative model that is conditional on channel.

That is, the apparatus for acquiring data may firstly acquire second channel information sample data (i.e., the first data) generated by the channel generative model, and then, the apparatus for acquiring data may input the second channel information sample data into the reference signal generative model that is conditional on channel. Thus, the reference signal generative model that is conditional on channel may generate, based on the input second channel information sample data, second reference signal sample data (i.e., the second data) that has association relationships with the second channel information sample data.

Alternatively, the channel generative model may have no input data, that is, the apparatus for acquiring data may directly generate the second channel information sample data by using the channel generative model.

Alternatively, the channel generative model may take, as input data, at least one of the following data: noise, random number, channel type indication information, real channel information, or statistical information of real channel information.

The noise, the random number and the channel type indication information are all similar to those described in the above embodiments, which will not be repeated here for the sake of brevity.

In addition, the real channel information may be actually collected or acquired by mathematical modeling. The statistical information of the real channel information includes but is not limited to a power spectral density, an average power spectral density and/or the like of the real channel information.

It may be understood that the channel generative model may generate the second channel information sample data under one or more frequency bands, radio frequency environments and wireless channel scenarios based on the above input data, so as to ensure the diversity and richness of the generated second channel information sample data.

Figure 10:
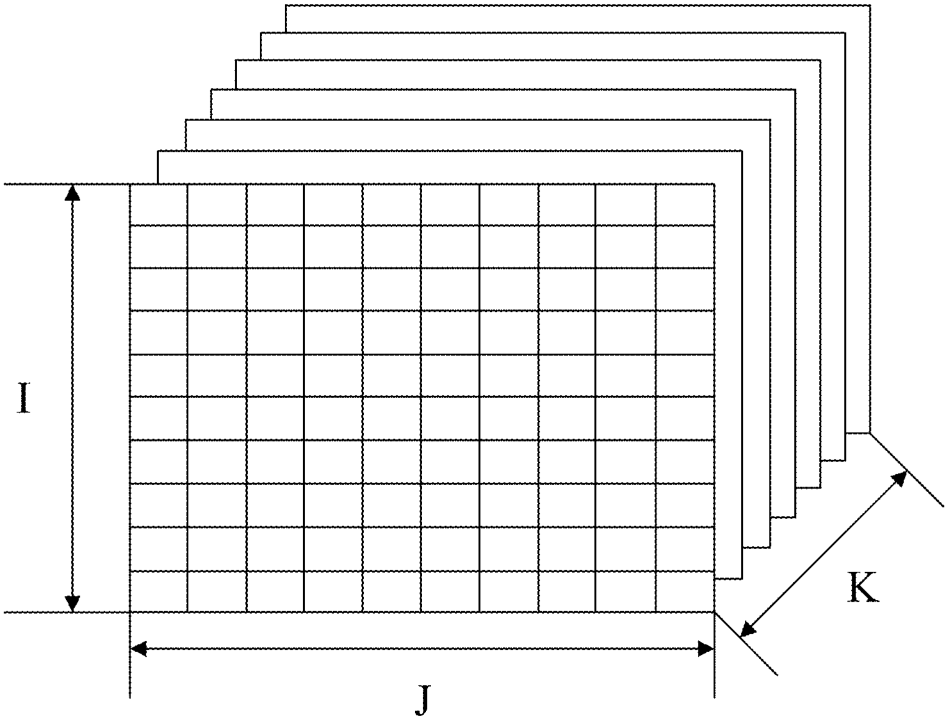
FIG. 10 is a structural diagram of channel information data provided by an embodiment of the present disclosure.

In the embodiments of the present disclosure, referring to FIG. 10, a single piece of second channel information sample data is composed of three-dimensional data in a time domain, a frequency domain, and an antenna pair domain and with a size of I*J*K. The values of I, J and K may be equal or not equal, which are not limited in the embodiments of the present disclosure. In addition, the three-dimensional data of I*J*K may be synthesized into a one-dimensional vector of 1*(I*J*K) or (I*J*K)*1, and the data format of the channel information sample data is not limited in the embodiments of the present disclosure.

It should be noted that in general, the channel information may be presented by a complex number. Therefore, the above second channel information sample data output by the channel generative model may be added with an additional dimension (i.e., the fourth dimension) on the basis of the three-dimensional data above, and the fourth dimension may characterize the real part and the imaginary part of the second channel information sample data. However, the second channel information sample data in the embodiments of the present disclosure is not limited to four dimensions or less, and the second channel information sample data may also include information of more dimensions.

Referring to FIG. 11, the input of the reference signal generative model that is conditional on channel in the embodiments of the present disclosure may be the second channel information sample data, and the output of the reference signal generative model that is conditional on channel may be reference signals corresponding to the second channel information sample data, i.e., the second reference signal sample data.

Alternatively, referring to FIG. 9, similar to the data format of the second channel information sample data, the second reference signal sample data may be composed of data in three dimensions of a frequency domain, a time domain, and an antenna pair domain and with a size of M*N*P. The values of M, N and P may be equal or not equal, which are not limited in the embodiments of the present disclosure. In addition, the three-dimensional data of M*N*P may be synthesized into a one-dimensional vector of 1*(M*N*P) or (M*N*P)*1, and the data format of the reference signal sample data is not limited in the embodiments of the present disclosure.

Alternatively, N may have the same value as I, M may have the same value as J, and K may have the same value as P.

It should be noted that the above second reference signal sample data output by the reference signal generative model that is conditional on channel may be added with an additional dimension (i.e., the fourth dimension) on the basis of the three-dimensional data above, and the fourth dimension may characterize the real part and the imaginary part of the second reference signal sample data. However, the second reference signal sample data in the embodiments of the present disclosure is not limited to four dimensions or less, and the second reference signal sample data may also include information of more dimensions.

In the embodiments of the present disclosure, the input data of the reference signal generative model that is conditional on channel may be the second channel information sample data under one or more frequency bands, radio frequency environments and wireless channel scenarios. Therefore, accordingly, the above reference signal generative model that is conditional on channel may also generate the second reference signal sample data under one or more frequency bands, radio frequency environments and wireless channel scenarios.

Thus, in the another implementation, a large quantity of virtual second channel information sample data may be firstly generated through the channel generative model, and then the generated second channel information sample data is used for generating respective second reference signal sample data corresponding to each second channel information sample data through the reference signal generative model that is conditional on channel, so as to construct multiple pairs of reference signal-channel information sample data with association relationships, for training a channel evaluation model.

A training process of the first generative model is described in detail below.

In the embodiments of the present disclosure, the training process of the first generative model may include the following operations.

In operation a1, third data output by a to-be-trained first generative model is acquired.

In operation a2, the third data is input into a first discriminative model, and a first discriminative result is output through the first discriminative model. The first discriminative model is used for discriminating a probability that a category corresponding to the third data is a category to which first real data belongs, and the first real data has an association relationship with the first generative model.

In operation a3, model parameters of the to-be-trained first generative model are adjusted based on the first discriminative result, to obtain the first generative model. A probability that a category corresponding to data generated by the first generative model is the category to which the first real data belongs is greater than a second threshold value.

It should be understood that for the training of the first generative model, it is necessary to construct two parts including the first generative model and the first discriminative model simultaneously. The first generative model is used for generating required data, and the first discriminative model is used for discriminating whether the data generated by the first generative model is true or false (or used for discriminating whether the virtual data is generated by the generative model or comes from real data). By alternately training the first generative model and the first discriminative model, the data generated by the trained first generative model may deceive the first discriminative model. That is, the first discriminative model cannot distinguish whether the data generated by the first generative model comes from real data or is generated by the first generative model.

The first real data has an association relationship with the first generative model. If the first generative model is the reference signal generative model, the first real data is real reference signals; if the first generative model is the channel generative model, the first real data is real channel information.

In one possible implementation, the first generative model may be the reference signal generative model in FIG. 8, the corresponding first discriminative model is a reference signal discriminative model, and the first real data is the real reference signals. Specifically, a training process of the reference signal generative model may be illustrated in FIG. 12.

Firstly, a to-be-trained reference signal generative model and a to-be-trained reference signal discriminative model are constructed. The to-be-trained reference signal generative model and the to-be-trained reference signal discriminative model may be composed of one or more of network structures including fully connected network, CNN, residual network and self-attention mechanism network.

Figure 13:
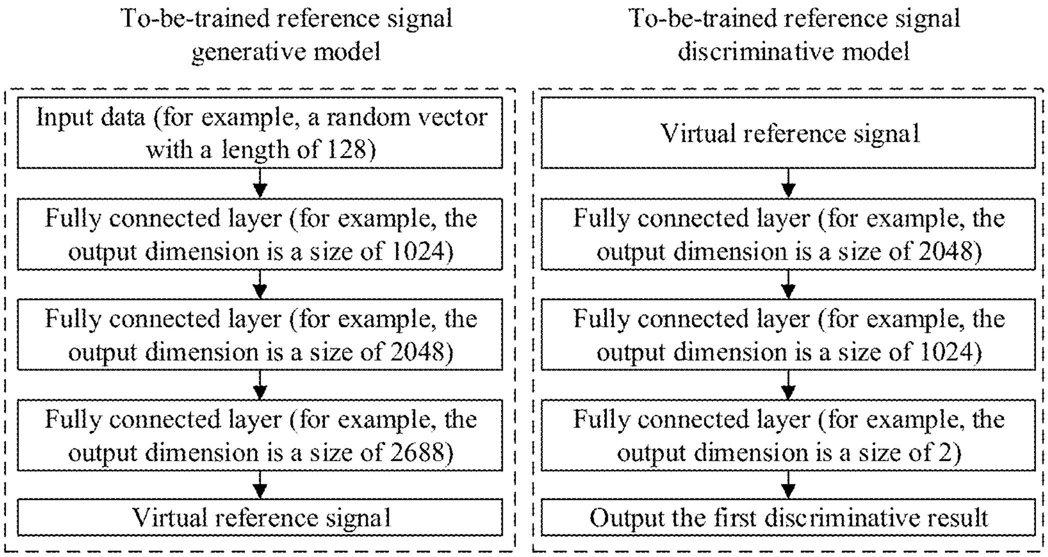
FIG. 13 is a first diagram of a network structure of a generative adversarial network provided by an embodiment of the present disclosure.

Exemplarily, as illustrated in FIG. 13, the to-be-trained reference signal generative model and the to-be-trained reference signal discriminative model may be composed of multiple fully connected layers. Different fully connected layers correspond to different dimensions to extract different data features.

In the embodiments of the present disclosure, same as the input of the reference signal generative model in the above embodiments, there may be no independent input for the to-be-trained reference signal generative model, or, at least one of noise, random number, channel type indication information, real reference signal, or statistical information of the real reference signal may be taken as input data.

In addition, the input of the to-be-trained reference signal discriminative model may be virtual reference signals (i.e., the third data) generated by the to-be-trained reference signal generative model, and real reference signals.

Specifically, when training, model parameters of the to-be-trained reference signal generative model may be kept unchanged firstly, and a virtual reference signal (i.e., the third data) generated by the to-be-trained reference signal generative model may be discriminated by the to-be-trained reference signal discriminative model, to determine a probability (i.e., the first discriminative result) that a category of the current virtual reference signal is a category to which a real reference signal belongs.

Furthermore, for the purpose of reducing the probability, model parameters of the to-be-trained reference signal discriminative model are adjusted, so that the to-be-trained reference signal discriminative model can distinguish the true and false of the reference signals as much as possible to obtain a trained reference signal discriminative model.

Figure 12:
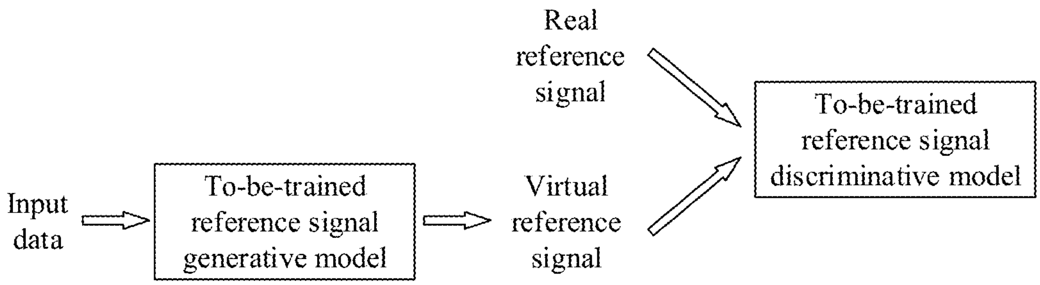
FIG. 12 is a diagram of a training process of a reference signal generative model provided by an embodiment of the present disclosure.

Further, as illustrated in FIG. 12, model parameters of the reference signal discriminative model are kept unchanged, and the virtual reference signal (i.e., the third data) generated by the to-be-trained reference signal generative model is discriminated by the reference signal discriminative model, to determine a probability (i.e., the first discriminative result) that the category of the currently generated virtual reference signal is the category to which the real reference signal belongs. Furthermore, for the purpose of increasing the probability, the model parameters of the to-be-trained reference signal generative model may be adjusted, so that the reference signal discriminative model cannot distinguish the differences between the virtual reference signals generated by the to-be-trained reference signal generative model and the real reference signals.

The above operations may be repeated. After several times of updates and iterations, when the reference signal discriminative model cannot discriminate whether a virtual reference signal generated by the to-be-trained reference signal generative model is generated or true, that is, when the reference signal discriminative model discriminates a probability that a category corresponding to the virtual reference signal generated by the to-be-trained reference signal generative model is a category to which a real reference signal belongs, and the probability is greater than the second threshold value, the reference signal discriminative model and the to-be-trained reference signal generative model reach a stable state, and the training is completed to obtain a trained reference signal generative model.

In this way, the apparatus for acquiring data may separately extract the trained reference signal generative model for generation of the reference signal sample data.

In another possible implementation, the first generative model may be the channel generative model in FIG. 11, the corresponding first discriminative model is a channel discriminative model, and the first real data is real channel information. Specifically, a training process of the channel generative model may be illustrated in FIG. 14.

Firstly, a to-be-trained channel generative model and a to-be-trained channel discriminative model are constructed. The to-be-trained channel generative model and the to-be-trained channel discriminative model may be composed of one or more of network structures including fully connected network, CNN, residual network and self-attention mechanism network.

Figure 15:
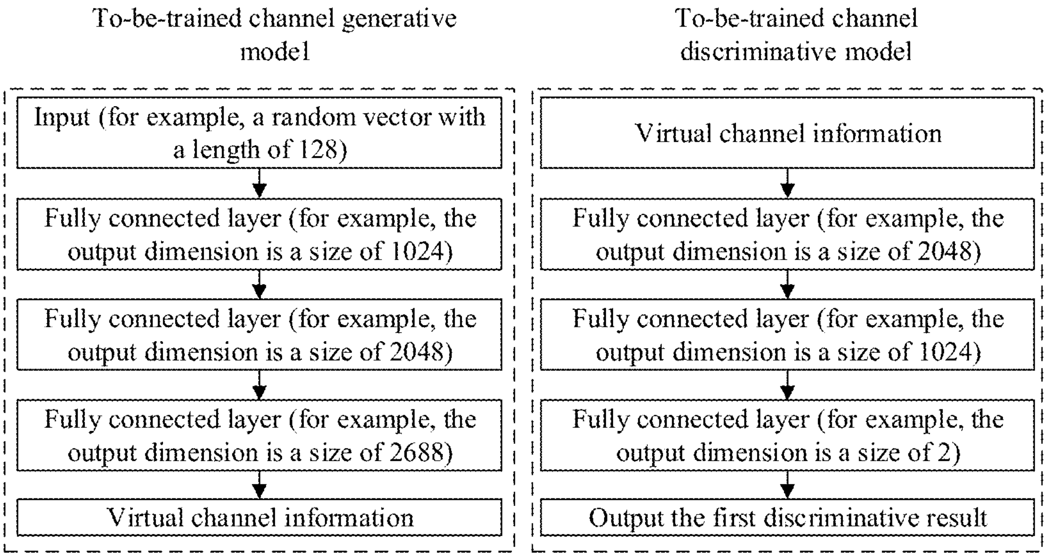
FIG. 15 is a second diagram of a network structure of a generative adversarial network provided by an embodiment of the present disclosure.

Exemplarily, as illustrated in FIG. 15, the to-be-trained channel generative model and the to-be-trained channel discriminative model may be composed of multiple fully connected layers. Different fully connected layers correspond to different dimensions to extract different data features.

In the embodiments of the present disclosure, same as the input of the channel generative model in the above embodiments, there may be no independent input for the to-be-trained channel generative model, or, at least one of noise, random number, channel type indication information, real channel information, or statistical information of the real channel information may be taken as input data.

In addition, the input of the to-be-trained channel discriminative model may be virtual channel information (i.e., the third data) generated by the to-be-trained channel generative model, and real channel information.

Specifically, when training, model parameters of the to-be-trained channel generative model may be kept unchanged firstly, and virtual channel information (i.e., the third data) generated by the to-be-trained channel generative model may be discriminated by the to-be-trained channel discriminative model, to determine a probability (i.e., the first discriminative result) that a category of the current virtual channel information is a category to which real channel information belongs. Furthermore, for the purpose of reducing the probability, model parameters of the to-be-trained channel discriminative model are adjusted, so that the to-be-trained channel discriminative model can distinguish the true and false of channel information as much as possible to obtain a trained reference signal discriminative model.

Figure 14:
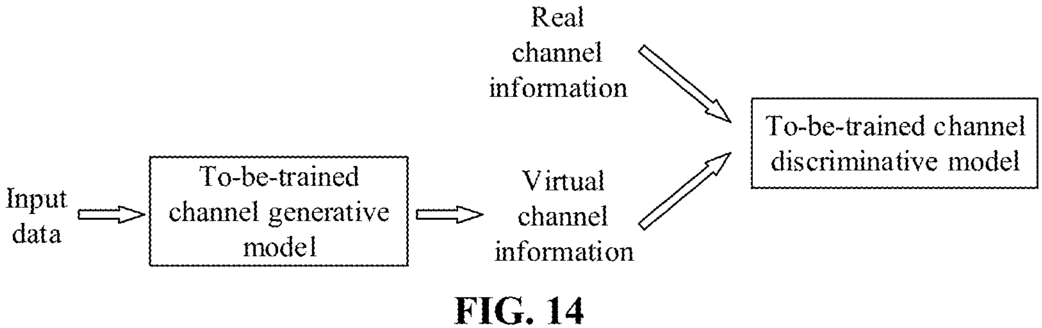
FIG. 14 is a diagram of a training process of a channel generative model provided by an embodiment of the present disclosure.

Further, as illustrated in FIG. 14, model parameters of the channel discriminative model are kept unchanged, and the virtual channel information (i.e., the third data) generated by the to-be-trained channel generative model is discriminated by the channel discriminative model, to determine a probability (i.e., the first discriminative result) that the category of the currently generated virtual channel information is the category to which the real channel information belongs. Furthermore, for the purpose of increasing the probability, the model parameters of the to-be-trained channel generative model may be adjusted, so that the channel discriminative model cannot distinguish the differences between the virtual channel information generated by the to-be-trained channel generative model and the real channel information.

The above operations may be repeated. After several times of updates and iterations, when the channel discriminative model cannot discriminate whether virtual channel information generated by the to-be-trained channel generative model is generated or true, that is, when the channel discriminative model discriminates a probability that a category corresponding to the virtual channel information generated by the to-be-trained channel generative model is a category to which real channel information belongs, and the probability is greater than the second threshold value, the channel discriminative model and the to-be-trained channel generative model reach a stable state, and the training is completed to obtain a trained channel generative model.

In this way, the apparatus for acquiring data may separately extract the trained channel generative model for generation of the channel information sample data.

A training process of the second generative model is described in detail below.

In the embodiments of the present disclosure, the training process of the second generative model may include the following operations.

In operation b1, fourth data is input into a to-be-trained second generative model, and fifth data is generated through the to-be-trained second generative model. The fourth data is data generated by the first generative model.

In operation b2, the fifth data is input into a second discriminative model, and a second discriminative result is output through the second discriminative model. The second discriminative result is used for discriminating a probability that a category corresponding to combined data is a category to which second real data belongs. The combined data includes the fourth data and the fifth data. The second real data includes the real reference signals and the real channel information.

In operation b3, model parameters of the to-be-trained second generative model are adjusted based on the second discriminative result, to obtain the second generative model. A probability that a category corresponding data formed by combining the data generated by the second generative model with the fourth data is the category to which the second real data belongs is greater than a third threshold value.

It should be understood that similar to the training process of the first generative model, for the training of the second generative model, it is also necessary to construct two parts including the second generative model and the second discriminative model simultaneously. Specifically, the second generative model is used for generating required data, and the second discriminative model is used for discriminating whether the data generated by the second generative model is true or false (or used for discriminating whether the virtual data is generated by the generative model or comes from real data). By alternately training the second generative model and the second discriminative model, the data generated by the trained second generative model may deceive the second discriminative model. That is, the second discriminative model cannot distinguish whether the data generated by the second generative model comes from real data or is generated by the second generative model.

Figure 16:
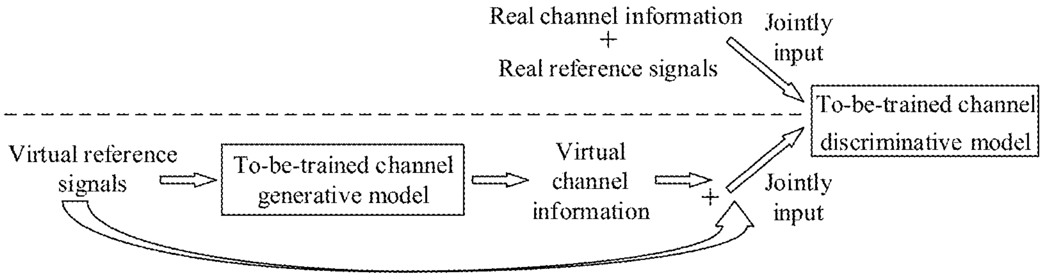
FIG. 16 is a diagram of a training process of a channel generative model that is conditional on reference signal provided by an embodiment of the present disclosure.

In one possible implementation, the second generative model may be the channel generative model that is conditional on reference signal which is illustrated in FIG. 8. FIG. 16 illustrates a training process of a channel generative model that is conditional on reference signal.

Specifically, a to-be-trained channel generative model and a to-be-trained channel discriminative model may be constructed firstly. The to-be-trained channel generative model and the to-be-trained channel discriminative model may be composed of one or more of network structures including fully connected network, CNN, residual network and self-attention mechanism network. Exemplarily, as illustrated in FIG. 15, the to-be-trained channel generative model and the to-be-trained channel discriminative model may be composed of multiple fully connected layers. Different fully connected layers correspond to different dimensions to extract different data features.

In this implementation, as illustrated in FIG. 16, input data (i.e., the fourth data) of the to-be-trained channel generative model may be virtual reference signals. The virtual reference signals may be reference signal sample data generated by the trained reference signal generative model. It may be understood that the virtual reference signals are taken as the input data of the to-be-trained channel generative model in this implementation, so that the to-be-trained channel generative model may generate channel information that has association relationships with the virtual reference signals, thereby obtaining corresponding reference signal-channel information sample data pairs.

As illustrated in FIG. 16, the input of the to-be-trained channel discriminative model in this implementation may include virtual reference signals (i.e., the fourth data), virtual channel information (i.e., the fifth data) generated by the to-be-trained channel generative model, real reference signals, and real channel information.

Alternatively, when input is performed to the to-be-trained channel discriminative model, the virtual reference signal (i.e., the fourth data) and the virtual channel information (i.e., the fifth data) may be jointly input, that is, the virtual reference signal and the virtual channel information may be combined into combined data for input. Exemplarily, the first reference signal sample data with the size of M*N*P illustrated in FIG. 9 and the first channel information sample data with the size of I*J*K illustrated in FIG. 10 may be combined into three-dimensional data of (M+I)*(N+J)*(P+K), and the three-dimensional data of (M+I)*(N+J)*(P+K) may be input into the to-be-trained channel discriminative model.

Similarly, when input is performed to the to-be-trained channel discriminative model, the real reference signal and the real channel information may be jointly input, that is, the real reference signal and the real channel information may be combined into real combined data for input.

Based on this, when training, model parameters of the to-be-trained channel generative model may be kept unchanged firstly, and combined data formed by a virtual reference signal (i.e., the fourth data) and virtual channel information (i.e., the fifth data) generated by the to-be-trained channel generative model may be discriminated by the to-be-trained channel discriminative model, to determine a probability (i.e., the second discriminative result) that a category corresponding to the combined data is a category to which real combined data belongs. Furthermore, for the purpose of reducing the probability, model parameters of the to-be-trained channel discriminative model are adjusted, so that the to-be-trained channel discriminative model can distinguish the true and false of combined data as much as possible to obtain a trained reference signal discriminative model.

Further, as illustrated in FIG. 16, model parameters of the channel discriminative model are kept unchanged, and the combined data formed by the virtual reference signal (i.e., the fourth data) and the virtual channel information (i.e., the fifth data) generated by the to-be-trained channel generative model is discriminated by the channel discriminative model, to determine a probability (i.e., the second discriminative result) that the category of the current combined data is the category to which the real combined data belongs. Furthermore, for the purpose of increasing the probability, the model parameters of the to-be-trained channel generative model may be adjusted, so that the channel discriminative model cannot distinguish the differences between the combined data and the real combined data.

The above operations may be repeated. After several times of updates and iterations, when the channel discriminative model cannot discriminate whether combined data is generated or true, that is, when the channel discriminative model discriminates a probability that a category of the combined data is a category to which real combined data belongs, and the probability is greater than the third threshold value, the channel discriminative model and the to-be-trained channel generative model reach a stable state, and the training is completed to obtain a trained channel generative model that is conditional on reference signal.

In this way, the apparatus for acquiring data may separately extract the trained channel generative model to obtain the channel generative model that is conditional on reference signal, so as to generate channel information sample data associated with the reference signal sample data.

In another possible implementation, the second generative model may be the reference signal generative model that is conditional on channel which is illustrated in FIG. 11. Specifically, FIG. 17 illustrates a training process of a reference signal generative model that is conditional on channel.

Specifically, a to-be-trained reference signal generative model and a to-be-trained reference signal discriminative model may be constructed firstly. The to-be-trained reference signal generative model and the to-be-trained reference signal discriminative model may be composed of one or more of network structures including fully connected network, CNN, residual network and self-attention mechanism network. Exemplarily, as illustrated in FIG. 13, the to-be-trained reference signal generative model and the to-be-trained reference signal discriminative model may be composed of multiple fully connected layers. Different fully connected layers correspond to different dimensions to extract different data features.

Figure 17:
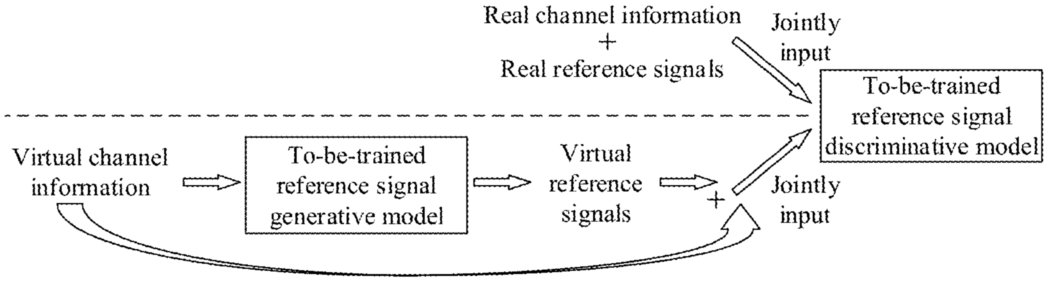
FIG. 17 is a diagram of a training process of a reference signal generative model that is conditional on channel provided by an embodiment of the present disclosure.

In this implementation, as illustrated in FIG. 17, input data (i.e., the fourth data) of the to-be-trained reference signal generative model may be virtual channel information. The virtual channel information may be channel information sample data generated by the trained channel generative model. It may be understood that the virtual channel information is taken as the input data of the to-be-trained reference signal generative model in this implementation, so that the to-be-trained reference signal generative model may generate reference signals that have association relationships with the virtual channel information, thereby obtaining corresponding reference signal-channel information sample data pairs.

As illustrated in FIG. 17, the input of the to-be-trained reference signal discriminative model in this implementation may include virtual channel information (i.e., the fourth data), virtual reference signals (i.e., fifth data) generated by the to-be-trained reference signal generative model, real reference signals, and real channel information.

Alternatively, when input is performed to the to-be-trained reference signal discriminative model, the virtual channel information (i.e., the fourth data) and the virtual reference signal (i.e., fifth data) may be jointly input, that is, the virtual channel information and the virtual reference signal may be combined into combined data for input. Exemplarily, the first reference signal sample data with the size of M*N*P illustrated in FIG. 9 and the first channel information sample data with the size of I*J*K illustrated in FIG. 10 may be combined into three-dimensional data of (M+I)*(N+J)*(P+K), and the three-dimensional data of (M+I)*(N+J)*(P+K) may be input into the to-be-trained reference signal discriminative model.

Similarly, when input is performed to the to-be-trained reference signal discriminative model, the real reference signal and the real channel information may be jointly input, that is, the real reference signal and the real channel information may be combined into real combined data for input.

Based on this, when training, model parameters of the to-be-trained reference signal generative model may be kept unchanged firstly, and combined data formed by virtual channel information (i.e., the fourth data) and a virtual reference signal (i.e., the fifth data) generated by the to-be-trained reference signal generative model may be discriminated by the to-be-trained reference signal discriminative model, to determine a probability (i.e., the second discriminative result) that a category corresponding to the combined data is a category to which real combined data belongs. Furthermore, for the purpose of reducing the probability, model parameters of the to-be-trained reference signal discriminative model are adjusted, so that the to-be-trained reference signal discriminative model can distinguish the true and false of combined data as much as possible to obtain a trained reference signal discriminative model.

Further, as illustrated in FIG. 16, model parameters of the reference signal discriminative model are kept unchanged, the combined data formed by the virtual channel information (i.e., the fourth data) and the virtual reference signal (i.e., the fifth data) generated by the to-be-trained reference signal generative model is discriminated by the reference signal discriminative model, to determine a probability (i.e., the second discriminative result) that the category of the current combined data is the category to which the real combined data belongs. Furthermore, for the purpose of increasing the probability, the model parameters of the to-be-trained reference signal generative model may be adjusted, so that the reference signal discriminative model cannot distinguish the differences between the combined data and the real combined data.

The above operations may be repeated. After several times of updates and iterations, when the reference signal discriminative model cannot discriminate whether combined data is generated or true, that is, when the reference signal discriminative model discriminates a probability that a category of the combined data is a category to which real combined data belongs, and the probability is greater than the third threshold value, the reference signal discriminative model and the to-be-trained reference signal generative model reach a stable state, and the training is completed to obtain a trained reference signal generative model that is conditional on channel.

In this way, the apparatus for acquiring data may separately extract the trained reference signal generative model to obtain the reference signal generative model that is conditional on channel, so as to generate reference signal sample data associated with the channel information sample data.

In addition to the above two separate generative models used to generate reference signal sample data and channel information sample data that have an association relationship, in some embodiments, the generative model may be a single complete generative model, that is, the generative model may simultaneously generate a pair of reference signal sample data and channel information sample data that have an association relationship.

Specifically, in the embodiments of the present disclosure, the generative model may have no independent input data, that is, the reference signal sample data and channel information sample data are directly generated by using the generative model. Alternatively, input data of the generative model may be at least one of noise, random number, channel type indication information, real reference signal, statistical information of the real reference signal, real channel information, or statistical information of the real channel information.

In addition, output data of the generative model may be combined data formed by reference signal sample data and channel information sample data. Exemplarily, the output data of the generative model may be three-dimensional data with the size of (M+I)*(N+J)*(P+K) formed by combining first reference signal sample data with the size of M*N*P illustrated in FIG. 9 and first channel information sample data with the size of I*J*K illustrated in FIG. 10.

The training process of this model is similar to the training process in the above embodiments, which will not be repeated here for the sake of brevity.

To sum up, the embodiments of the present disclosure provide a method for acquiring data. Specifically, the apparatus for acquiring data can acquire reference signal sample data and channel information sample data that are generated by the generative model. The generative model is obtained through training based on a GAN, real reference signals and real channel information. In addition, the reference signal sample data and the channel information sample data are used for training a channel estimation model. It can be seen that in the present disclosure, the reference signal sample data and the channel information sample data are generated through the trained generative model, and the generative model is constructed based on the GAN, so that the training of the generative model can be implemented only by a small quantity of real reference signals and real channel information, thus avoiding collection of a large quantity of real reference signals and real channel information as well as the modeling process of the channels, and greatly reducing the difficulty and labor overhead of data acquisition.

Preferred embodiments of the present disclosure have been described in detail with reference to the accompanying drawings, but the present disclosure is not limited to the specific details of the above embodiments. Within the scope of the technical conception of the present disclosure, various simple modifications may be made to the technical solutions of the present disclosure, and these simple modifications all belong to the scope of protection of the present disclosure. For example, various specific technical features described in the above specific embodiments may be combined in any suitable manner without contradiction, and various possible combinations are not further described in the present disclosure in order to avoid unnecessary repetition. For another example, any combination may be made between the various embodiments of the present disclosure, so long as it does not depart from the idea of the present disclosure and is likewise to be regarded as the contents disclosed in the present disclosure. For another example, on the premise of no conflict, various embodiments described in the present disclosure and/or the technical features in various embodiments may be arbitrarily combined with the related art, and the technical solutions obtained after combination should also fall within the scope of protection of the present disclosure.

Figure 18:
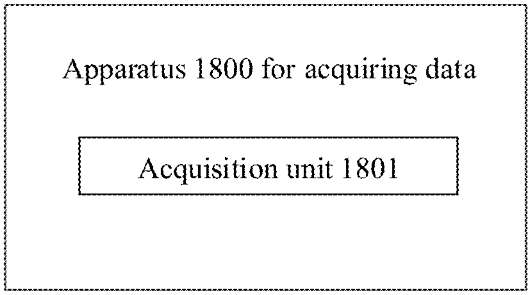
FIG. 18 is a structural diagram of an apparatus for acquiring data provided by an embodiment of the present disclosure.

FIG. 18 is a first structural diagram of an apparatus 1800 for acquiring data provided by an embodiment of the present disclosure. As illustrated in FIG. 18, the apparatus for acquiring data includes an acquisition unit 1801.

The acquisition unit 1801 is configured to acquire reference signal sample data and channel information sample data that are generated by a generative model. The generative model is trained based on a GAN, real reference signals and real channel information.

The reference signal sample data and the channel information sample data are used for training a channel estimation model.

In some embodiments, the reference signal sample data has association relationships with the channel information sample data.

In some embodiments, the real reference signals are received through channels corresponding to the real channel information.

In some embodiments, a quantity of the real reference signals and a quantity of the real channel information are a preset quantity. The preset quantity is less than or equal to a first threshold value.

In some embodiments, the generative model includes a first generative model and a second generative model.

The acquisition unit 1801 is specifically configured to acquire first data generated by the first generative model and input the first data into the second generative model to acquire second data generated by the second generative model.

The first generative model is a reference signal generative model and the second generative model is a channel generative model, or the first generative model is a channel generative model and the second generative model is a reference signal generative model. The reference signal generative model is used for generating the reference signal sample data, and the channel generative model is used for generating the channel information sample data.

In some embodiments, the apparatus further includes a first training unit. The first training unit is configured to acquire third data output by a to-be-trained first generative model, input the third data into a first discriminative model, output a first discriminative result through the first discriminative model, and adjust model parameters of the to-be-trained first generative model based on the first discriminative result, to obtain the first generative model. The first discriminative model is used for discriminating a probability that a category corresponding to the third data is a category to which first real data belongs, and the first real data has an association relationship with the first generative model. A probability that a category corresponding to data generated by the first generative model is the category to which the first real data belongs is greater than a second threshold value.

In some embodiments, the first generative model is the reference signal generative model, and the first generative model has no input data in a process of the first generative model generating the data, or at least one of the following data is taken by the first generative model as input data: noise, random number, channel type indication information, real reference signal, or statistical information of the real reference signal.

In some embodiments, the first generative model is the channel information generative model, and the first generative model has no input data in a process of the first generative model generating the data, or at least one of the following data is taken by the first generative model as input data: noise, random number, channel type indication information, real channel information, or statistical information of the real channel information.

In some embodiments, the channel type indication information includes at least one of: first indication information indicating a frequency band in which a channel is located; second indication information indicating a radio frequency environment; or third indication information indicating a wireless channel scenario.

In some embodiments, the apparatus further includes a second training unit. The second training unit is configured to input fourth data into a to-be-trained second generative model, generate fifth data through the to-be-trained second generative model, input the fifth data into a second discriminative model, output a second discriminative result through the second discriminative model, and adjust model parameters of the to-be-trained second generative model based on the second discriminative result, to obtain the second generative model. The fourth data is data generated by the first generative model. The second discriminative result is used for discriminating a probability that a category corresponding to combined data is a category to which second real data belongs. The combined data includes the fourth data and the fifth data, and the second real data includes the real reference signals and the real channel information. A probability that a category corresponding data formed by combining the data generated by the second generative model with the fourth data is the category to which the second real data belongs is greater than a third threshold value.

In some embodiments, the second generative model is the channel information generative model and the fourth data is data generated by the reference signal generative model.

In some embodiments, the second generative model is the reference signal generative model and the fourth data is data generated by the channel information generative model.

Those skilled in the art will appreciate that the above description of the apparatus for acquiring data in the embodiments of the present disclosure may be understood with reference to the description of the method for acquiring data in the embodiments of the present disclosure.

Figure 19:
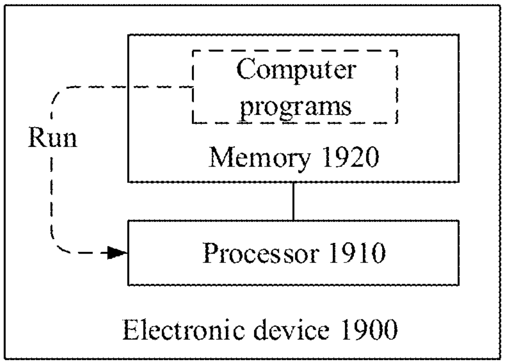
FIG. 19 is a structural diagram of an electronic device provided by an embodiment of the present disclosure.

FIG. 19 is a structural diagram of an electronic device 1900 provided by an embodiment of the present disclosure. The electronic device may be a third party server, a terminal device, or a network device, which is not limited in the embodiment of the present disclosure. The electronic device 1900 illustrated in FIG. 19 includes a processor 1910. The processor 1910 may invoke and run computer programs from a memory to implement the methods in embodiments of the present disclosure.

Alternatively, as illustrated in FIG. 19, the electronic device 1900 may further include a memory 1920. The processor 1910 may invoke and run computer programs from the memory 1920 to implement the method for acquiring data in embodiments of the present disclosure.

The memory 1920 may be a separate device independent of the processor 1910 or may be integrated in the processor 1910.

Figure 20:
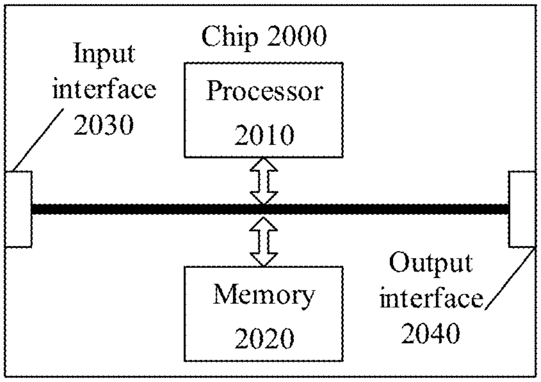
FIG. 20 is a block diagram of a chip provided by an embodiment of the present disclosure.

FIG. 20 is a structural diagram of a chip provided by an embodiment of the present disclosure. The chip 2000 illustrated in FIG. 20 includes a processor 2010. The processor 2010 may invoke and run computer programs from a memory to implement the methods in the embodiments of the present disclosure.

Alternatively, as illustrated in FIG. 20, the chip 2000 may further include a memory 2020. The processor 2010 may invoke and run computer programs from the memory 2020 to implement the methods in the embodiments of the present disclosure.

The memory 2020 may be a separate device independent of the processor 2010 or may be integrated in the processor 2010.

Alternatively, the chip 2000 may further include an input interface 2030. The processor 2010 may control the input interface 2030 to communicate with other devices or chips, and in particular may obtain information or data transmitted by other devices or chips.

Alternatively, the chip 2000 may further include an output interface 2040. The processor 2010 may control the output interface 2040 to communicate with other devices or chips, and in particular may output information or data to other devices or chips.

Alternatively, the chip may be applied to the network device in the embodiments of the present disclosure, and the chip may implement the corresponding flows realized by the network device in various methods of the embodiments of the present disclosure, which will not be repeated here for the sake of brevity.

Alternatively, the chip may be applied to the mobile terminal/terminal device in the embodiments of the present disclosure, and the chip may implement the corresponding flows realized by the mobile terminal/terminal device in various methods of the embodiments of the present disclosure, which will not be repeated here for the sake of brevity.

It should be understood that the chip referred to in embodiments of the present disclosure may also be referred to as a system level chip, a system chip, a chip system or a system-on-chip, or the like.

It should be understood that the processor in the embodiments of the present disclosure may be an integrated circuit chip having signal processing capability. In implementation, the operations of the above method embodiments may be accomplished by integrated logic circuitry of hardware in the processor or instructions in the form of software. The above processor may be a general purpose processor, a Digital Signal Processor (DSP), an Application Specific Integrated Circuit (ASIC), a Field Programmable Gate Array (FPGA), other programmable logic devices, discrete gates, transistor logic devices, or discrete hardware components. The methods, operations and logic block diagrams disclosed in the embodiments of the present disclosure may be implemented or performed. The general purpose processor may be a microprocessor or the processor may be any conventional processor or the like. The operations of the methods disclosed in combination with the embodiments of the present disclosure may be directly embodied as the execution of the hardware decoding processor or the combined execution of the hardware and software modules in the decoding processor. The software module may be located in a Random Access Memory (RAM), a flash memory, a Read-Only Memory (ROM), a Programmable ROM (PROM), an electrically erasable PROM (EEPROM), a register or other mature storage medium in the art. The storage medium is located in the memory, and the processor reads the information in the memory and completes the operations of the methods in combination with its hardware.

It is understood that the memory in embodiments of the present disclosure may be a volatile memory or a non-volatile memory or may include both volatile and non-volatile memory. The non-volatile memory may be a ROM, a PROM, an Erasable PROM (EPROM), an EEPROM, or a flash memory. The volatile memory may be a RAM which serves as an external cache. By way of illustration, but not limitation, many forms of RAMs are available, such as a static RAM (SRAM), a Dynamic RAM (DRAM), a Synchronous DRAM (SDRAM), a Double Data Rate SDRAM (DDR SDRAM), an Enhanced SDRAM (ESDRAM), an Synchlink DRAM (SLDRAM), and a Direct Rambus RAM (DR RAM). It should be noted that the memory in the systems and methods described herein is intended to include but not limited to these and any other suitable types of memories.

It should be understood that the above memory is exemplary, but not limiting, and, for example, the memory in embodiments of the present disclosure may also be an SRAM, a DRAM, an SDRAM, a DDR SDRAM, an ESDRAM, an SLDRAM, a DR RAM, or the like. That is, the memory in embodiments of the present disclosure is intended to include but not limited to these and any other suitable types of memories.

The embodiments of the present disclosure further provide a computer readable storage medium for storing computer programs.

Alternatively, the computer readable storage medium may be applied to the network device in the embodiments of the present disclosure, and the computer programs cause the computer to execute the corresponding flows implemented by the electronic device in the various methods of the embodiments of the present disclosure, which will not be repeated here for the sake of brevity.

The embodiments of the present disclosure further provide a computer program product, including computer program instructions.

Alternatively, the computer program product may be applied to the electronic device in the embodiments of the present disclosure, and the computer program instructions cause the computer to execute the corresponding flows implemented by the network device in the various methods of the embodiments of the present disclosure, which will not be repeated here for the sake of brevity.

The embodiments of the present disclosure further provide a computer program.

Alternatively, the computer program may be applied to the electronic device in the embodiments of the present disclosure and, when the computer program is run on the computer, the computer executes the corresponding flows implemented by the network device in the various methods of the embodiments of the present disclosure, which will not be repeated here for the sake of brevity.

Those of ordinary skill in the art will appreciate that the various example units and algorithm operations described in combination with the embodiments disclosed herein may be implemented in electronic hardware or a combination of computer software and electronic hardware. Whether these functions are performed in hardware or software depends on the specific application and design constraints of the technical solutions. Skilled artisans may use a different method for each particular application to implement the described functionality, but such implementation should not be considered outside the scope of the present disclosure.

Those skilled in the art will clearly appreciate that for convenience and conciseness of description, the specific operating processes of the above described systems, apparatuses and units may be made with reference to the corresponding processes in the aforementioned method embodiments, which will not be repeated here for the sake of brevity.

In several embodiments provided herein, it should be understood that the disclosed systems, apparatuses and methods may be implemented in other ways. For example, the above embodiments of the apparatuses are only schematic, for example, the division of the units is only a logical function division, and in practice, there may be another division mode, for example, multiple units or components may be combined or integrated into another system, or some features may be ignored or not performed. On the other hand, the coupling, direct coupling or communication connection between each other shown or discussed may be indirect coupling or communication connection through some interfaces, apparatus or units, and may be electrical, mechanical or other forms.

The units illustrated as separate components may or may not be physically separated, and the components displayed as units may or may not be physical units, i.e., may be located in one place, or may be distributed over multiple network units. Part or all of the units may be selected according to the actual needs to achieve the purpose of the embodiments.

In addition, various functional units in each embodiment of the present disclosure may be integrated in one processing unit, or each unit may exist physically alone, or two or more units may be integrated in one unit.

The functions may be stored in a computer readable storage medium if implemented in the form of software functional units and sold or used as stand-alone products. With this understanding, the technical solution of the present disclosure in essence or in part contributing to the prior art may be embodied in the form of a software product. The computer software product is stored in a storage medium, including instructions for causing a computer device (which may be a personal computer, a server, or a network device, or the like) to perform all or part of the operations of the methods described in various embodiments of the present disclosure. The above storage medium includes a U disk, a removable hard disk, a ROM, a RAM, a magnetic disk or an optical disk or other medium capable of storing program codes.

The above-mentioned is only the specific embodiments of the present disclosure, but the scope of protection of the present disclosure is not limited thereto. Any technical person familiar with the technical field can easily think of changes or substitutions within the technical scope disclosed in the present disclosure, which should be covered within the scope of protection of the present disclosure. Therefore, the scope of protection of the present disclosure shall be subject to the scope of protection of the claims.

The invention claimed is:

1. A method for acquiring data, comprising:

acquiring, by an electronic device, reference signal sample data and channel information sample data that are generated by a generative model, the generative model being obtained through training based on a Generative Adversarial Network (GAN), real reference signals and real channel information, wherein the reference signal sample data and the channel information sample data are used for training a channel estimation model, and the channel estimation model is used to perform channel estimation or channel recovery in a wireless communication system, wherein the generative model comprises a first generative model and a second generative model, and wherein acquiring the reference signal sample data and the channel information sample data that are generated by the generative model comprises:

acquiring first data generated by the first generative model; and inputting the first data into the second generative model to acquire second data generated by the second generative model, wherein the first generative model is a reference signal generative model and the second generative model is a channel generative model, or the first generative model is a channel generative model and the second generative model is a reference signal generative model, the reference signal generative model being used for generating the reference signal sample data, and the channel generative model being used for generating the channel information sample data, wherein a training process of the second generative model comprises:

inputting fourth data into a to-be-trained second generative model, and generating fifth data through the to-be-trained second generative model, wherein the fourth data is data generated by the first generative model;

inputting the fifth data into a second discriminative model, and outputting a second discriminative result through the second discriminative model, wherein the second discriminative result is used for discriminating a probability that a category corresponding to combined data is a category to which second real data belongs, the combined data comprises the fourth data and the fifth data, and the second real data comprises the real reference signals and the real channel information; and adjusting model parameters of the to-be-trained second generative model based on the second discriminative result, to obtain the second generative model, wherein a probability that a category corresponding data formed by combining the data generated by the second generative model with the fourth data is the category to which the second real data belongs is greater than a third threshold value.

2. The method of claim 1, wherein the reference signal sample data has association relationships with the channel information sample data.

3. The method of claim 1, wherein the real reference signals are received through channels corresponding to the real channel information.

4. The method of claim 1, wherein a quantity of the real reference signals and a quantity of the real channel information are a preset quantity, the preset quantity being less than or equal to a first threshold value.

5. The method of claim 1, wherein a training process of the first generative model comprises:

acquiring third data output by a to-be-trained first generative model;

inputting the third data into a first discriminative model, and outputting a first discriminative result through the first discriminative model, wherein the first discriminative model is used for discriminating a probability that a category corresponding to the third data is a category to which first real data belongs, and the first real data has an association relationship with the first generative model; and adjusting model parameters of the to-be-trained first generative model based on the first discriminative result, to obtain the first generative model, wherein a probability that a category corresponding to data generated by the first generative model is the category to which the first real data belongs is greater than a second threshold value.

6. The method of claim 1, wherein the first generative model is the reference signal generative model, and the first generative model has no input data in a process of the first generative model generating the data, or the first generative model takes, as input data, at least one of the following data:

noise, random number, channel type indication information, real reference signal, or statistical information of the real reference signal; or wherein the first generative model is the channel generative model, and the first generative model has no input data in a process of the first generative model generating the data, or the first generative model takes, as input data, at least one of the following data:

noise, random number, channel type indication information, real channel information, or statistical information of the real channel information.

7. The method of claim 6, wherein the channel type indication information comprises at least one of:

first indication information indicating a frequency band in which a channel is located;

second indication information indicating a radio frequency environment; or third indication information indicating a wireless channel scenario.

8. The method of claim 1, wherein the second generative model is the channel generative model and the fourth data is data generated by the reference signal generative model; or wherein the second generative model is the reference signal generative model and the fourth data is data generated by the channel generative model.

9. An electronic device, comprising:

a processor; and a memory for storing computer programs that, when executed by the processor, cause the processor to acquire reference signal sample data and channel information sample data that are generated by a generative model, the generative model being obtained through training based on a Generative Adversarial Network (GAN), real reference signals and real channel information, wherein the reference signal sample data and the channel information sample data are used for training a channel estimation model, and the channel estimation model is used to perform channel estimation or channel recovery in a wireless communication system wherein the generative model comprises a first generative model and a second generative model, wherein the processor is configured to acquire first data generated by the first generative model and input the first data into the second generative model to acquire second data generated by the second generative model, wherein the first generative model is a reference signal generative model and the second generative model is a channel generative model, or the first generative model is a channel generative model and the second generative model is a reference signal generative model, the reference signal generative model being used for generating the reference signal sample data, and the channel generative model being used for generating the channel information sample data, wherein the processor is configured to:

input fourth data into a to-be-trained second generative model, and generate fifth data through the to-be-trained second generative model, wherein the fourth data is data generated by the first generative model;

input the fifth data into a second discriminative model, and output a second discriminative result through the second discriminative model, wherein the second discriminative result is used for discriminating a probability that a category corresponding to combined data is a category to which second real data belongs, the combined data comprises the fourth data and the fifth data, and the second real data comprises the real reference signals and the real channel information; and adjust model parameters of the to-be-trained second generative model based on the second discriminative result, to obtain the second generative model, wherein a probability that a category corresponding data formed by combining the data generated by the second generative model with the fourth data is the category to which the second real data belongs is greater than a third threshold value.

10. The electronic device of claim 9, wherein the reference signal sample data has association relationships with the channel information sample data.

11. The electronic device of claim 9, wherein the real reference signals are received through channels corresponding to the real channel information.

12. The electronic device of claim 9, wherein a quantity of the real reference signals and a quantity of the real channel information are a preset quantity, the preset quantity being less than or equal to a first threshold value.

13. The electronic device of claim 9, wherein the processor is configured to:

acquire third data output by a to-be-trained first generative model;

input the third data into a first discriminative model, and output a first discriminative result through the first discriminative model, wherein the first discriminative model is used for discriminating a probability that a category corresponding to the third data is a category to which first real data belongs, and the first real data has an association relationship with the first generative model; and adjust model parameters of the to-be-trained first generative model based on the first discriminative result, to obtain the first generative model, wherein a probability that a category corresponding to data generated by the first generative model is the category to which the first real data belongs is greater than a second threshold value.

14. The electronic device of claim 9, wherein the first generative model is the reference signal generative model, and the first generative model has no input data in a process of the first generative model generating the data, or the first generative model takes, as input data, at least one of the following data:

noise, random number, channel type indication information, real reference signal, or statistical information of the real reference signal; or wherein the first generative model is the channel generative model, and the first generative model has no input data in a process of the first generative model generating the data, or the first generative model takes, as input data, at least one of the following data:

noise, random number, channel type indication information, real channel information, or statistical information of the real channel information.

15. The electronic device of claim 9, wherein the second generative model is the channel generative model and the fourth data is data generated by the reference signal generative model; or wherein the second generative model is the reference signal generative model and the fourth data is data generated by the channel generative model.

16. A chip, comprising:

a processor, configured to invoke and run computer programs from a memory to cause an electronic device on which the chip is mounted to acquire reference signal sample data and channel information sample data that are generated by a generative model, the generative model being obtained through training based on a Generative Adversarial Network (GAN), real reference signals and real channel information, wherein the reference signal sample data and the channel information sample data are used for training a channel estimation model, and the channel estimation model is used to perform channel estimation or channel recovery in a wireless communication system, wherein the generative model comprises a first generative model and a second generative model, wherein the processor is configured to acquire first data generated by the first generative model and input the first data into the second generative model to acquire second data generated by the second generative model, wherein the first generative model is a reference signal generative model and the second generative model is a channel generative model, or the first generative model is a channel generative model and the second generative model is a reference signal generative model, the reference signal generative model being used for generating the reference signal sample data, and the channel generative model being used for generating the channel information sample data, wherein the processor is configured to:

input fourth data into a to-be-trained second generative model, and generate fifth data through the to-be-trained second generative model, wherein the fourth data is data generated by the first generative model:

input the fifth data into a second discriminative model, and output a second discriminative result through the second discriminative model, wherein the second discriminative result is used for discriminating a probability that a category corresponding to combined data is a category to which second real data belongs, the combined data comprises the fourth data and the fifth data, and the second real data comprises the real reference signals and the real channel information; and adjust model parameters of the to-be-trained second generative model based on the second discriminative result, to obtain the second generative model, wherein a probability that a category corresponding data formed by combining the data generated by the second generative model with the fourth data is the category to which the second real data belongs is greater than a third threshold value.

* * * * *